US011797944B2

(12) United States Patent
Guillon et al.

(10) Patent No.: US 11,797,944 B2
(45) Date of Patent: Oct. 24, 2023

(54) SMART INTEGRATION WITH EMAIL PARSER

(71) Applicant: AMADEUS S.A.S., Biot (FR)

(72) Inventors: Nicolas Guillon, Mougins (FR); Eduardo Rafael Lopez Ruiz, Antibes (FR); Jose Da Cruz, Antibes (FR)

(73) Assignee: Amadeus S.A.S., Biot (FR)

( * ) Notice: Subject to any disclaimer, the term of this patent is extended or adjusted under 35 U.S.C. 154(b) by 366 days.

(21) Appl. No.: 16/951,561

(22) Filed: Nov. 18, 2020

(65) Prior Publication Data
US 2021/0150598 A1 May 20, 2021

(30) Foreign Application Priority Data
Nov. 20, 2019 (FR) ...................................... 1912925

(51) Int. Cl.
G06Q 30/04 (2012.01)
G06Q 10/107 (2023.01)
G06Q 20/04 (2012.01)
H04L 67/306 (2022.01)
H04L 51/42 (2022.01)
H04L 101/37 (2022.01)

(52) U.S. Cl.
CPC ......... G06Q 10/107 (2013.01); G06Q 20/047 (2020.05); G06Q 30/04 (2013.01); H04L 51/42 (2022.05); H04L 67/306 (2013.01); H04L 2101/37 (2022.05)

(58) Field of Classification Search
CPC .... G06Q 10/107; G06Q 20/102; G06Q 20/14; G06Q 30/0242; G06Q 30/0264; G06Q 30/0276; G06Q 30/0277; G06Q 30/04; G06Q 50/167; G06K 9/00469; H04T 2001/215

USPC .......................................................... 705/34
See application file for complete search history.

(56) References Cited

U.S. PATENT DOCUMENTS 6,128,646 A    10/2000  Miloslavsky
8,332,349 B1*  12/2012  Wilson .................. G06Q 40/06
                                                   707/607
10,909,580 B1*  2/2021  Krishnamurthy .. G06Q 30/0201
11,042,951 B2*  6/2021  Aizen .................. G06Q 50/167
11,157,954 B1* 10/2021  Belanger ............ G06Q 30/0201
(Continued)

FOREIGN PATENT DOCUMENTS

EP         3316202 A1     5/2018
WO      2017060850 A1     4/2017

OTHER PUBLICATIONS

National Institute of Industrial Property, Preliminary Search Report issued in French Patent Application No. 1912925 dated Apr. 20, 2020.

(Continued)

Primary Examiner — Andrew Joseph Rudy
(74) Attorney, Agent, or Firm — Thompson Hine LLP

(57) ABSTRACT

Systems and methods for modifying electronic mail having receipt data for interception by mail transport agents. An invoice email sent by an email server is received when a transport agent of the email server detects a pattern within content of an inbound email. The invoice email is parsed to extract receipt data and an email address that identifies a recipient of the inbound email. The receipt data is pushed to an expense management system associated with the recipient for further processing.

10 Claims, 8 Drawing Sheets

(56) References Cited

U.S. PATENT DOCUMENTS

| | | | |
|---|---|---|---|
| 11,244,407 B2* | 2/2022 | Whitley | H04W 88/02 |
| 11,282,069 B2* | 3/2022 | Chattopadhyay | G06Q 10/06313 |
| 11,381,271 B1* | 7/2022 | Zalewski | H04W 76/14 |
| 11,425,084 B2* | 8/2022 | Zhang | H04L 51/234 |
| 11,625,465 B2* | 4/2023 | Anderson | G06F 21/32 726/28 |
| 2003/0217176 A1 | 11/2003 | Beunings | |
| 2003/0220875 A1 | 11/2003 | Lam et al. | |
| 2019/0096012 A1* | 3/2019 | Sankey | G06Q 50/163 |
| 2020/0058024 A1 | 2/2020 | Muller et al. | |

OTHER PUBLICATIONS

European Patent Office, Search Report issued in Application No. 20207811 dated Dec. 3, 2020.

* cited by examiner

```
900 ─┐      ┌─────────────────────────────────────┐  ┐
            │ <script type="application/ld+json"> │  ├ 910
            │ {                                   │  ┘
            │                                     │  ┐
            │   "@context": "http://schema.org/", │  ├ 920
            │   "@type": "Receipt",               │  ┘
            │   "broker": {                       │  ┐
    940 ┤   │     "@type": "LocalBusiness",       │  ├ 930
            │     "name": "Accors Hotel"          │  │
            │   },                                │  │
            │   "customer": {                     │  │
    950 ┤   │     "@type": "Person",              │  │
            │     "name": "John Doe"              │  │
            │   },                                │  │
            │   "payment": {                      │  │
    960 ┤   │     "@type": "PriceSpecification",  │  │
            │     "price": 140.00,                │  │
            │     "priceCurrency": "USD"          │  │
            │   }                                 │  │
            │ }                                   │  │
            │ </script>                           │  ┘
            └─────────────────────────────────────┘
```

FIG. 9

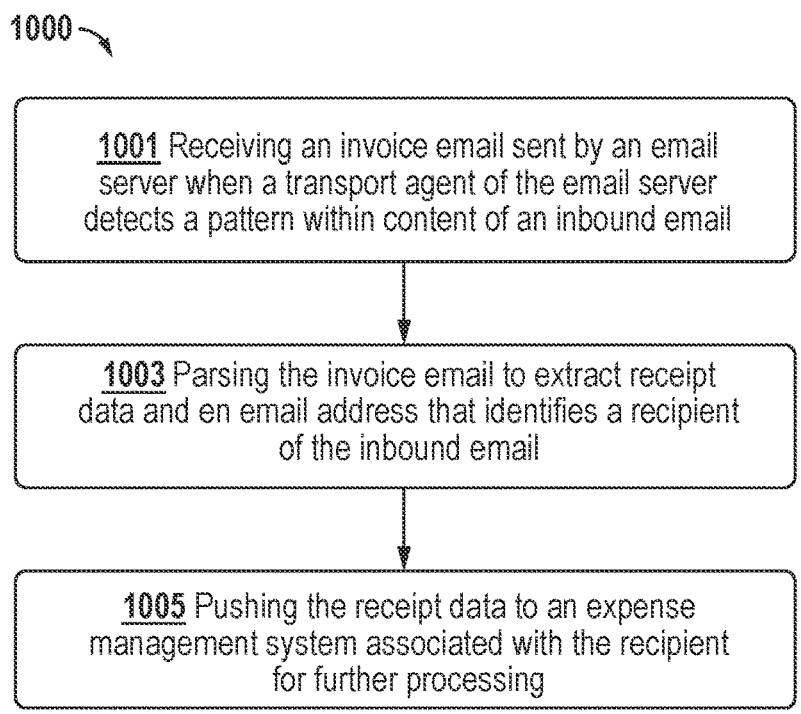

FIG. 10

SMART INTEGRATION WITH EMAIL PARSER

TECHNICAL FIELD

The present invention relates generally to electronic mail routing techniques, although not limited thereto. More specifically, the present invention relates to techniques of modifying electronic mail having receipt data for interception by mail transport agents.

BACKGROUND

Electronic mail (or email) is a common medium used to convey receipt data corresponding to an exchange of goods and/or services for compensation in transactions, such as online transactions. Some participants to such transactions utilize such receipt data for expense reimbursement purposes, accounting purposes, reporting purposes, and the like. Each party involved in processing receipt data represents an opportunity for introducing error. As such, the opportunity for introducing error into the processing of receipt data proportionally increases with each party involved in that processing. Such error reduces an accuracy of results obtained from that process.

By way of example, an employee travelling on behalf of an employer may submit a request to the employer seeking reimbursement for expenses relating to that travel. In this example, the employer may require receipt data to support that request. Such receipt data may include receipt data generated by a hotel provider for services rendered to the employee while travelling. Various errors may be introduced by each party involved in processing that receipt data as it propagates from the hotel provider to an expense management system utilized by the employer. For example, data entry errors may be introduced by a party that receives the receipt data from the employee on behalf of the expense management system. As another example, the receipt data may be misplaced by the party receiving that data on behalf of the expense management system or the employee may forget to forward the receipt data to the expense management system for further processing.

In view of the above, reducing the number of parties involved in processing receipt data may reduce the opportunity for introducing error thereby improving the accuracy of results obtained from such processing. Thus, improved techniques are needed that reduce the number of parties involved in processing receipt data to reduce the opportunity for introducing error into such processing and improve the accuracy of results obtained from such processing.

SUMMARY

Embodiments of the present invention provide systems, methods, and computer-readable storage media for modifying electronic mail having receipt data for interception by mail transport agents. In an embodiment, a system includes a processor and a computer-readable storage medium that includes instructions. Upon execution by the processor, the instructions cause the system to perform operations. The operations include receiving an invoice email sent by an email server when a transport agent of the email server detects a pattern within content of an inbound email. The invoice email is parsed to extract receipt data and an email address that identifies a recipient of the inbound email. The receipt data is pushed to an expense management system associated with the recipient for further processing.

In further embodiments, the inbound email includes a destination header field comprising a proxy email address generated by adding one or more of an extension and a transaction identifier to the email address. In further embodiments, the proxy email address is generated by an online transaction platform responsive to a transaction underlying the receipt data. In further embodiments, the receipt data is extracted by an optical character recognition process. In further embodiments, the pattern corresponds to a flag defined by metadata introduced into a subset of the content by an originator of the inbound email. In further embodiments, the subset of the content includes: plain text header information, an attachment, HyperText Markup Language header information, or a combination thereof. In further embodiments, the expense management system is configured to perform a reconciliation process using the receipt data that maps: (i) the recipient to a user profile associated with the expense management system; (ii) the receipt data to a transaction associated with the receipt data; (iii) the receipt data to an expense statement comprising the transaction; or a combination thereof. In further embodiments, the invoice email includes self-describing data encoding the receipt data. In further embodiments, the self-describing data is injected into the invoice email as: plain text header information, attachment metadata, HyperText Markup Language header information, or a combination thereof. In further embodiments, the pattern corresponds to a white list of providers comprising an originator email address included within an originator header field of the inbound email. In further embodiments, the inbound email is sent by an originator responsive to completion of a transaction underlying the receipt data.

In another embodiment, a method includes receiving an invoice email sent by an email server when a transport agent of the email server detects a pattern within content of an inbound email. The invoice email is parsed to extract receipt data and an email address that identifies a recipient of the inbound email. The receipt data is pushed to an expense management system associated with the recipient for further processing.

In further embodiments, the method further comprises pushing the email address to the expense management system to facilitate reconciliation of the recipient with a user profile of the expense management system. In further embodiments, the method further comprises performing a reconciliation process that maps: (i) the recipient to a user profile associated with the expense management system; (ii) the receipt data to a transaction associated with the receipt data; (iii) the receipt data to an expense request comprising the transaction; or a combination thereof. In further embodiments, the invoice email is received at a mailbox managed by a receipt manager platform. In further embodiments, the receipt data is pushed to the expense management system as self-describing data encoding the receipt data. In further embodiments, the inbound email includes a flag defined by metadata introduced into a subset of the content by an originator of the inbound email. In further embodiments, the inbound email includes a destination header field comprising a proxy email address pushed into a profile database managed by an originator of the inbound email by an online transaction platform involved in a transaction underlying the receipt data. In further embodiments, the method further comprises selecting the expense management system from a plurality of expense management systems based on the email address.

In another embodiment, a non-transitory computer-readable storage medium including computer-readable instructions is provided. Upon execution by a processor of a computing device, the computer-readable instructions cause the computing device to receive an invoice email sent by an email server when a transport agent of the email server detects a pattern within content of an inbound email. The invoice email is parsed to extract receipt data and an email address that identifies a recipient of the inbound email. The receipt data is pushed to an expense management system associated with the recipient for further processing.

BRIEF DESCRIPTION OF THE DRAWINGS

The accompanying drawings illustrate various embodiments of the present invention and, together with the general description of the invention given above, and the detailed description of the embodiments given below, explain the embodiments of the invention. In the drawings, like reference numerals are used to indicate like parts in the various views.

FIG. 9 illustrates an example of self-describing data encoding receipt data in accordance with embodiments of the present invention.

FIG. 10 is a flow-chart illustrating an example of a method of modifying electronic mail having receipt data for interception by mail transport agents, in accordance with an embodiment of the invention.

DETAILED DESCRIPTION

Figure 1:
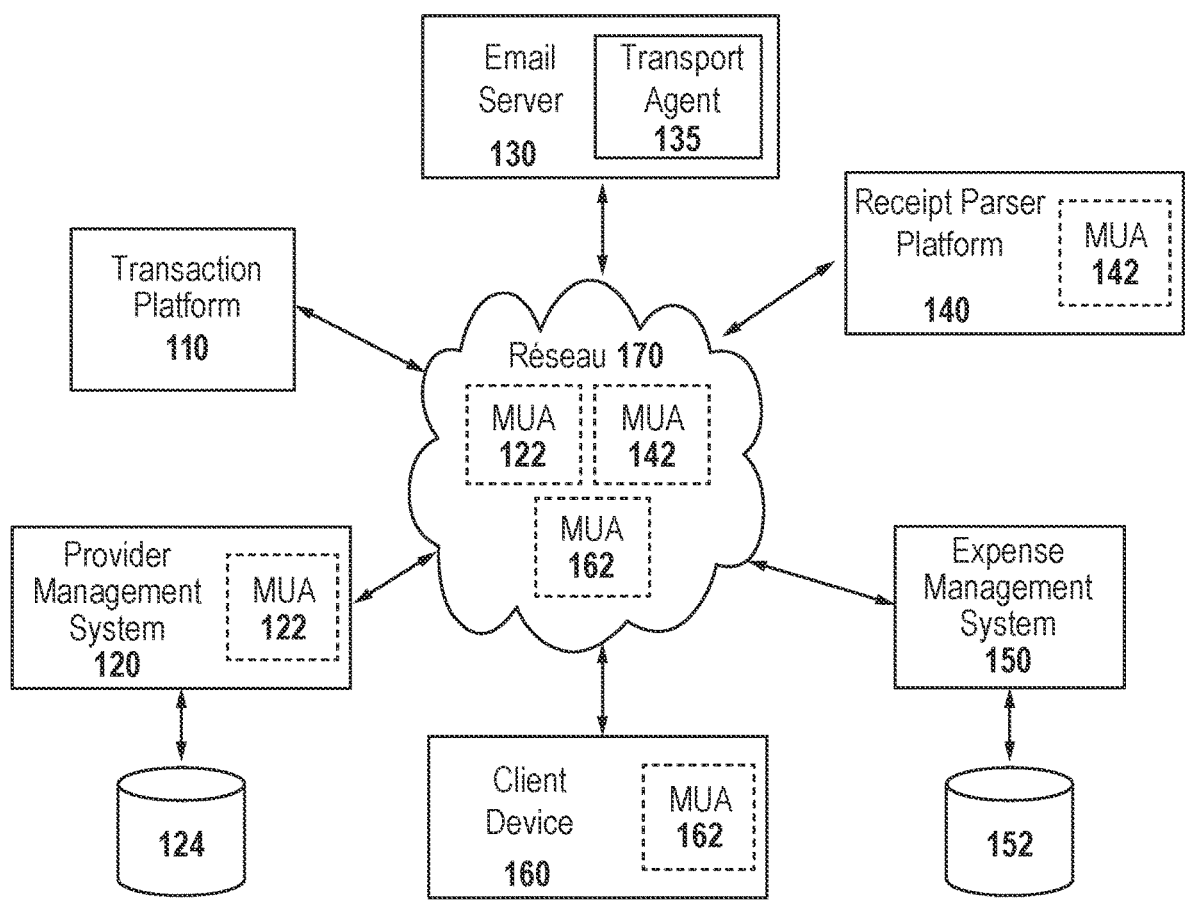
FIG. 1 is a block diagram of an example operating environment that is suitable for implementing aspects of the present invention.

Techniques described herein relate to modifying electronic mail (or email) having receipt data for interception by mail transport agents. Referring to FIG. 1, an example operating environment for implementing aspects of the present invention is illustrated and designated generally 100. Operating environment 100 includes online transaction platform (or transaction platform) 110, provider management system 120, email server 130, receipt manager platform 140, expense management system 150, and client device 160. FIG. 1 depicts the various computing devices as communicating with each other via networks (e.g., network 170), which may include one or more public and/or private networks. Examples of networks that are suitable for implementing network 170 include: local area networks (LANs), wide area networks (WANs), cellular networks, the Internet, and the like.

Transaction platform 110 is configured to facilitate with transactions between merchants or providers offering goods and/or services and end users. In facilitating such transactions, transaction platform 110 receives requests for the goods and/or services that end users submit via network 170 using a client device (e.g., client device 160). Transaction platform 110 generates a response for each request by compiling information (e.g., availability, pricing, delivery options, and the like) regarding goods and/or services satisfying that request.

Transaction platform 110 obtains such information by: submitting queries to one or more systems (e.g., provider management system 120) operated by a merchant or provider offering relevant goods and/or services; querying a local cached source comprising information regarding relevant goods and/or services, or a combination thereof. Each response generated by transaction platform 110 is communicated to a given client device submitting a corresponding request via network 170. Transaction platform 110 is further configured to procure specific goods and/or services identified in responses for end users by interacting with a given system (e.g., provider management system 120) operated by a merchant or provider offering those specific goods and/or services.

Provider management system 120 is generally configured to respond to queries submitted by transaction platforms (e.g., transaction platform 110) or end users using client devices (e.g., client device 160) via network 170 regarding goods and/or services offered by a provider (or merchant) operating provider management system 120. Information regarding such goods and/or services (e.g., inventory information, pricing information, and the like) are stored in a database 124 managed by provider management system 120. Database 124 also stores user profile information concerning end users effectuating transactions with provider management system either directly or via a transaction platform (e.g., transaction platform 110).

Email server 130 is generally configured to route emails exchanged between mail user agents ("MUAs") according to Simple Mail Transfer Protocol ("SMTP"). Each email that email server 130 routes includes a header section and a body that are collectively referred to herein as "content". If structured, a body of an email is formatted in accordance with a Multipurpose Internet Mail Extensions ("MIME") format. Any attachments to an email are incorporated into the body. Such attachments may include: word processor document files, portable document format files, spread sheet files, image files (e.g., JPEG files, BMP files, GIF files, and the like), and the like.

The header section includes a plurality of header fields comprising an originator header field and a recipient header field. The originator header field includes an email address associated with an MUA sending a given email. The recipient header field includes an email address associated with an MUA receiving a given email. For example, if provider management system 120 sends an email to client device 160, the originator header field of the email would be populated with an email address associated with an MUA 122 that provider management system 120 uses to send the email. The recipient header field of that email would be populated with an MUA 162 that client device 160 uses to receive emails.

Each MUA in operating environment 100 may be effectuated using local computing resources or network computing resources. For example, an MUA 142 used by receipt manager platform 140 may be effectuated using local computing resources as seen in FIG. 1. In this example, the MUA effectuated using local computing resources may be called an email client. As another example, the MUA 142 used by receipt manager platform 140 may be effectuated using network computing resources as also seen in FIG. 1. In this example, the MUA effectuated using network computing resources may be called a webmail client.

Receipt manager platform 140 is generally configured to push receipt data received at a mailbox associated with MUA 142 to expense management system 150 for further processing. Receipt data is received at the mailbox when transport agent 135 of email server 130 detect a pattern within content of an inbound email, as described in greater detail below. The pattern detected within content of the inbound email indicates to transport agent 135 that the inbound email comprises receipt data. Examples of such patterns are discussed in greater detail below with respect to FIGS. 2-5.

Receipt manager platform 140 also parses each inbound email received at the mailbox associated with MUA 142 to extract receipt data contained therein and an email address that identifies an original recipient of that inbound email. By way of example, the email address that identifies the original recipient of that inbound email may be associated with MUA 162. In an embodiment, receipt manager platform 140 is further configured to perform a reconciliation process using receipt data that maps: (i) a recipient of an inbound email to a user profile associated with expense management system 150; (ii) the receipt data to a transaction associated with the receipt data; (iii) the receipt data to an expense statement comprising the transaction; or a combination thereof.

Expense management system 150 is generally configured to effectuate expense review processes on receipt data corresponding to transactions involving end users. Such expense review processes may include evaluating a given expense request for compliance with one or more reimbursement policy rules. For example, if an expense request is submitted by an employee, an employer of the employee may establish the one or more reimbursement policy rules. Expense review processes may further include generating a report that details the results of evaluating a given expense request. In an embodiment, expense management system 150 is configured to push such reports to a system managed a party responsible for payment of expense requests (e.g., an employer).

Another expense review process may comprise verifying receipt data accompanying a given expense request for accuracy. In an embodiment, expense management system 150 may interact with provider management system 120 to verify receipt data generated by provider management system 120. By way of example, expense management system 150 may interact with provider management system 120 to determine whether receipt data reconciled with a given expense request is consistent with corresponding receipt data generated by provider management system 120. Expense review processes may further include auditing expense requests to detect instances of fraud.

Information relating to expense requests and receipt data are stored in a database 152 managed by expense management system 150. Database 152 also stores user profile information concerning end users submitting expense requests with expense management system 150 either directly or via a transaction platform (e.g., transaction platform 110). In an embodiment, expense management system 150 is further configured to perform a reconciliation process using receipt data that maps: (i) a recipient of an inbound email to a user profile stored in database 152; (ii) the receipt data to a transaction associated with the receipt data; (iii) the receipt data to an expense statement stored in database 152 comprising the transaction; or a combination thereof.

An end user, in operating environment 100, interacts with transaction platform 110 using client device 160 to effectuate transactions via network 170. The end user also interacts with expense management system 150 using client device 160 to perform operations related to expense requests seeking reimbursement for expenses relating to such transactions. The operations related to expense requests may include: submitting a new expense request, modifying an existing expense request, determining a status of an existing expense request, and the like. Example computing devices that are suitable for implementing client device 160 include: a desktop computer, a laptop computer, a mobile computing device, a smartphone, a tablet computer, a smart watch, a consumer electronic device, a workstation, and the like.

Figure 2:
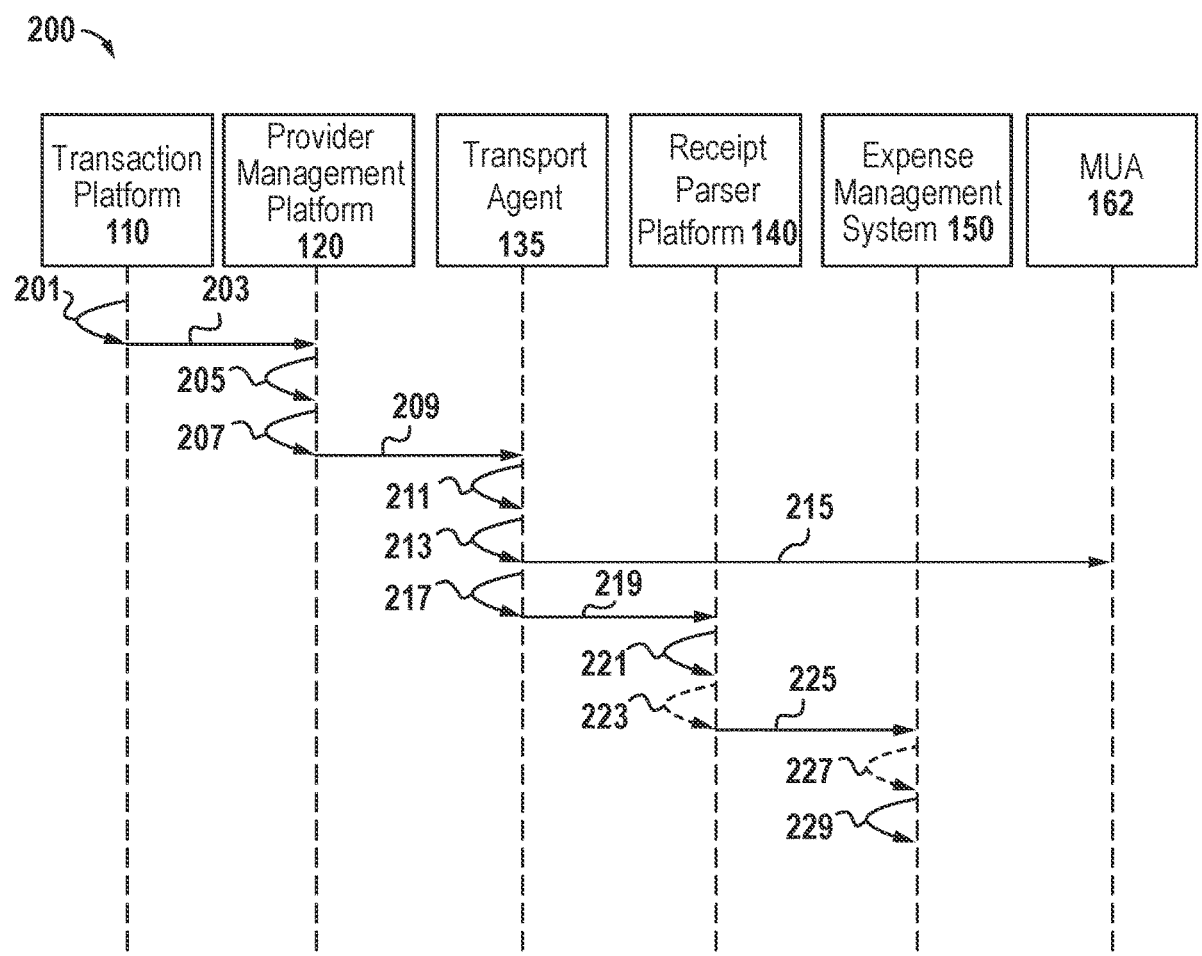
FIG. 2 is a flow diagram depicting an example process of modifying electronic mail having receipt data for interception by mail transport agents.

FIGS. 2-5 are flow diagrams depicting example processes of modifying electronic mail having receipt data for interception by mail transport agents, in accordance with embodiments of the present disclosure. FIG. 2 illustrates an example process 200 in which transaction platform 110 generates a proxy email address responsive to a transaction with an end user involving a good and/or service offered by a provider associated with provider management system 120, at step 201. The proxy email address may be implemented using proxy email addresses 630, 730, or 840 discussed in greater detail below with respect to FIGS. 6, 7, and 8, respectively.

At step 203, transaction platform 110 pushes the proxy email address into a record associated with the end user stored within a profile database (e.g., profile database 124 of FIG. 1) managed by provider management system 120. As used herein, "push" refers to a first computing device automatically transmitting data to a second computing device in accordance with computer-readable instructions executed by one or more processors of the first computing device. Upon delivering the good and/or service underlying the transaction to the end user, provider management system 120 generates receipt data for the transaction, at step 205. At step 207, provider management system 120 creates an email with an MUA (e.g., MUA 122 of FIG. 1) that includes the receipt data and a destination header field comprising the proxy email address. At step 209, the provider management system 120 communicates the email to the proxy email address using the MUA.

At step 211, transport agent 135 detects a pattern within the email indicative of emails comprising receipt data. The pattern detected by transport agent 135 at step 211 being defined, at least in part, by the proxy email address. In an embodiment, the pattern includes one or more additional criterion comprising: identifying an attachment within content of the email, identifying predefined characters within a subject header field of the email, comparing the destination header field and/or an originator header field of the email to a black list, and the like.

At step 213, transport agent 135 creates a forwarding email including the receipt data and a destination header field comprising an email address of the end user retrieved from the proxy email address. In an embodiment, a body of the forwarding email comprises a message associated with the receipt data introduced by transport agent 135 that was not present in the inbound email. By way of example, the message may include an indication that the receipt data was forwarded to expense management system 150 (e.g., "This email has been forwarded to your expense management system."). In an embodiment, transport agent 135 is alternatively configured to provide the end user with the receipt data via a web service or similar technology. At step 215, transport agent 135 communicates the forwarding email to a MUA 162 associated with the end user. At step 217, transport agent 135 creates an invoice email including a destination header field comprising an email address of receipt manager platform 140. In an embodiment, transport agent 135 determines the email address of receipt manager platform 140 using an extension retrieved from the proxy email address. At step 219, transport agent 135 communicates the invoice email to a mailbox managed by receipt manager platform 140.

At step 221, receipt manager platform 140 parses the invoice email to extract the receipt data and an email address (e.g., an email address of MUA 162) that identifies a recipient of the email communicated by provider management system 120 in step 209. In an embodiment, receipt manager platform 140 extracts the receipt data using an optical character recognition process. At optional step 223, receipt manager platform 140 performs a reconciliation process that maps: (i) the recipient to a user profile associated with expense management system 150; (ii) the receipt data to the transaction associated with the proxy email address generated in step 201; (iii) the receipt data to an expense request comprising that transaction; or a combination thereof.

At step 225, receipt manager platform 140 pushes the receipt data to expense management system 150 for further processing. At optional step 227, expense management system 150 performs the reconciliation process discussed above with respect to optional step 223. At step 229, expense management system 150 performs further processing on the receipt data by initiating one or more of the expense review processes discussed above with respect to FIG. 1.

Figure 3:
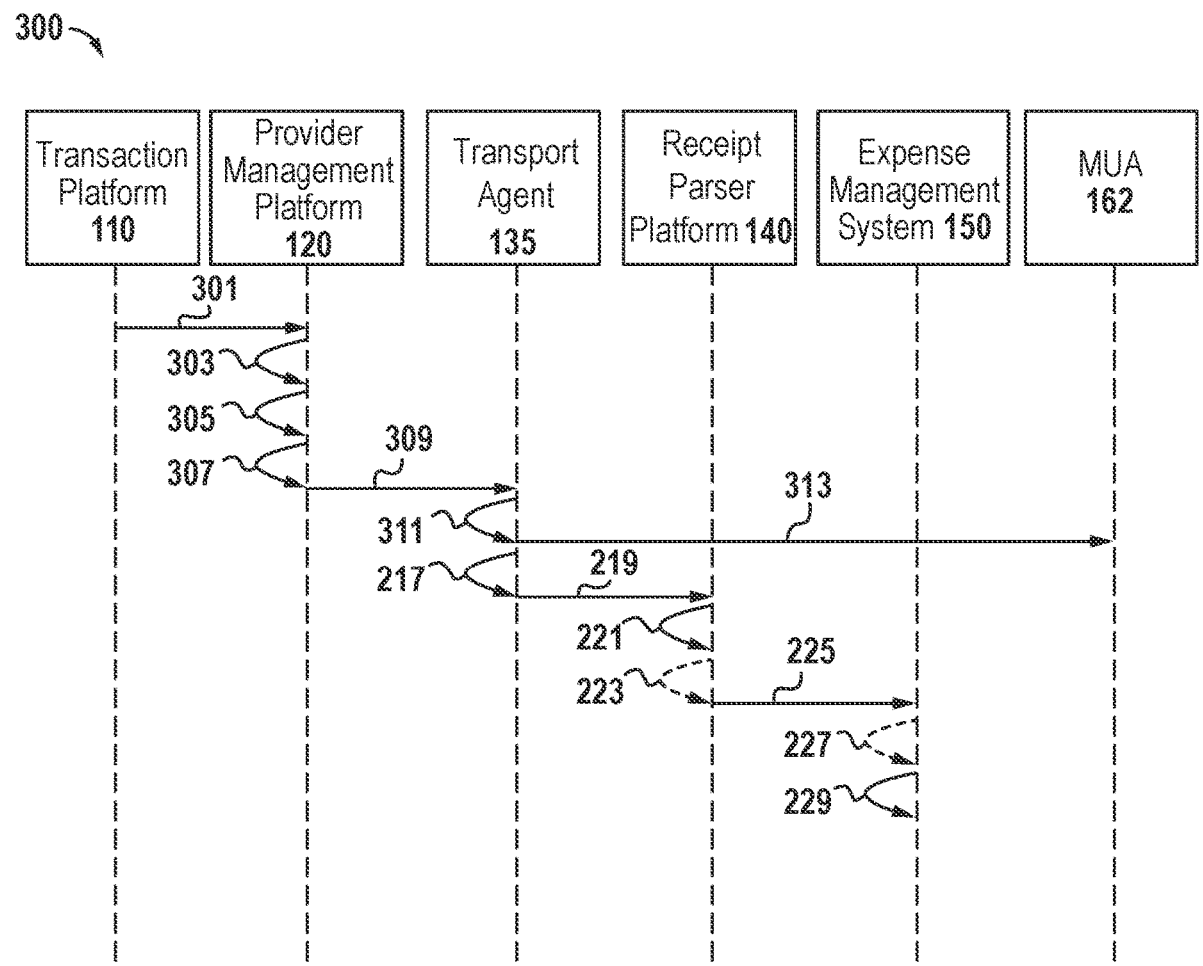
FIG. 3 is a flow diagram depicting another example process of modifying electronic mail having receipt data for interception by mail transport agents.

FIG. 3 illustrates an example process 300 in which transaction platform 110 pushes an email address associated with an end user into a record associated with the end user that is stored within a profile database (e.g., profile database 124 of FIG. 1) managed by provider management system 120, at step 301. The email address being provided to transaction platform 110 by the end user as part of a transaction involving a good and/or service offered by a provider associated with provider management system 120.

Upon delivering the good and/or service underlying the transaction to the end user, provider management system 120 generates receipt data for the transaction, at step 303. At step 305, provider management system 120 creates an email with an MUA (e.g., MUA 122 of FIG. 1) that includes the receipt data and a destination header field comprising the email address provided by the end user. At step 307, provider management system 120 introduces meta data that defines a flag into a subset of content comprising the email. In an embodiment, the subset of the content includes: plain text header information, an attachment, HTML header information, or a combination thereof. At step 309, the provider management system 120 communicates the email to the email address using the MUA.

At step 311, transport agent 135 detects a pattern within the email indicative of emails comprising receipt data. The pattern detected by transport agent 135 at step 311 being defined, at least in part, by the flag. In an embodiment, the pattern includes one or more additional criterion comprising: identifying an attachment within content of the email, identifying predefined characters within a subject header field of the email, comparing the destination header field and/or an originator header field of the email to a black list, and the like. At step 313, transport agent 135 forwards the email to a MUA 162 associated with the end user. As seen in FIG. 3, process 300 concludes with steps 217-229 from process 200 of FIG. 2.

Figure 4:
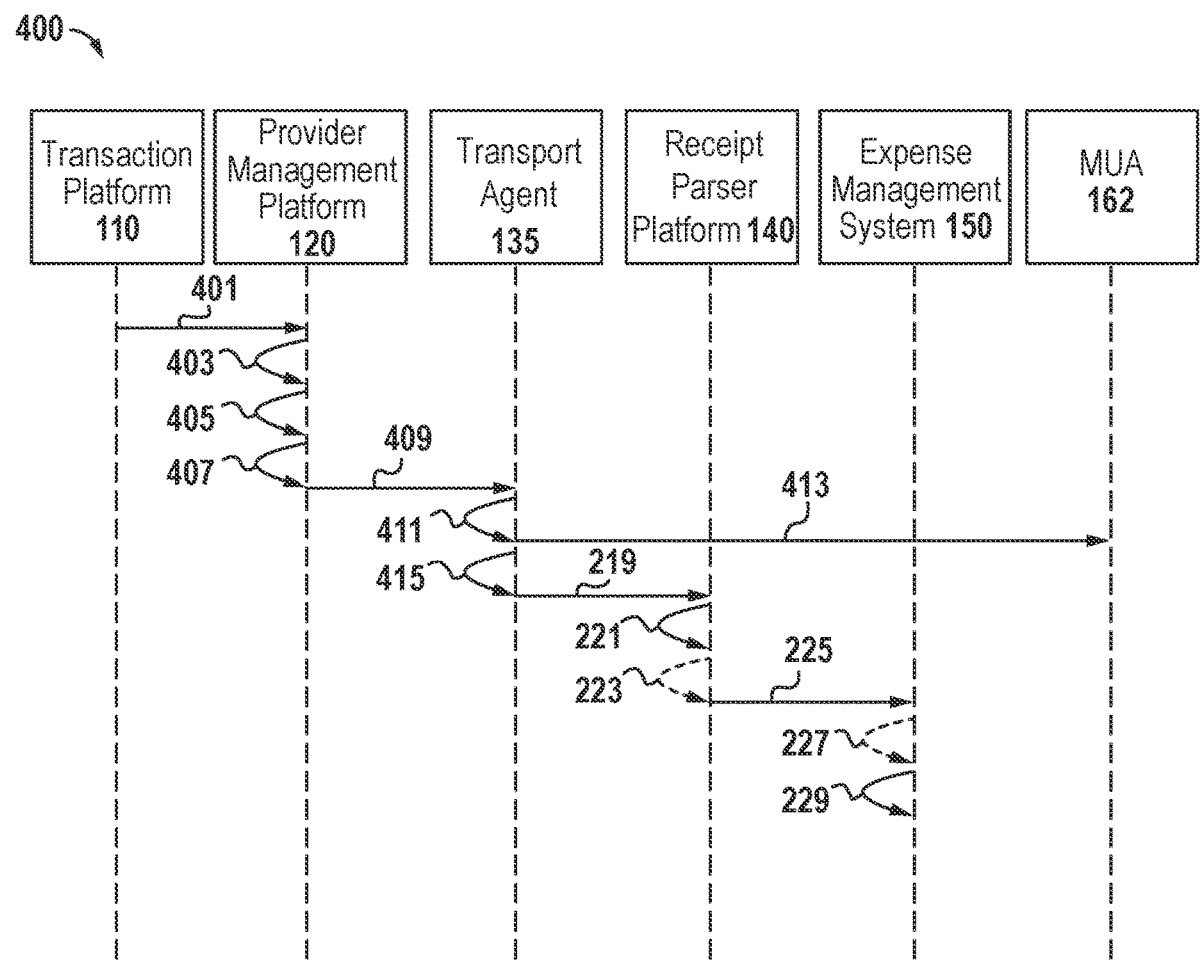
FIG. 4 is a flow diagram depicting another example process of modifying electronic mail having receipt data for interception by mail transport agents.

FIG. 4 illustrates an example process 400 in which transaction platform 110 pushes an email address associated with an end user into a record associated with the end user that is stored within a profile database (e.g., profile database 124 of FIG. 1) managed by provider management system 120, at step 401. The email address being provided to transaction platform 110 by the end user as part of a transaction involving a good and/or service offered by a provider associated with provider management system 120.

Upon delivering the good and/or service underlying the transaction to the end user, provider management system 120 generates receipt data for the transaction, at step 403. At step 405, provider management system 120 generates self-describing data that encodes the receipt data. The self-describing data may be implemented using self-describing data 900 discussed in greater detail below with respect to FIG. 9. At step 407, provider management system 120 creates an email with an MUA (e.g., MUA 122 of FIG. 1) that includes the self-describing data encoding the receipt data and a destination header field comprising the email address provided by the end user. In an embodiment, the self-describing data is injected into the email as: plain text header information, attachment metadata, HTML header information, or a combination thereof. At step 409, the provider management system 120 communicates the email to the email address using the MUA.

At step 411, transport agent 135 detects a pattern within the email indicative of emails comprising receipt data. The pattern detected by transport agent 135 at step 411 being defined, at least in part, by the self-describing data. In an embodiment, the pattern includes one or more additional criterion comprising: identifying an attachment within content of the email, identifying predefined characters within a subject header field of the email, comparing the destination header field and/or an originator header field of the email to a black list, and the like. At step 413, transport agent 135 forwards the email to a MUA 162 associated with the end user.

At step 415, transport agent 135 creates an invoice email including the self-describing data and a destination header field comprising an email address of receipt manager platform 140. In an embodiment, the self-describing data is injected into the invoice email as: plain text header information, attachment metadata, HTML header information, or a combination thereof. As seen in FIG. 4, process 400 concludes with steps 219-229 from process 200 of FIG. 2.

Figure 5:
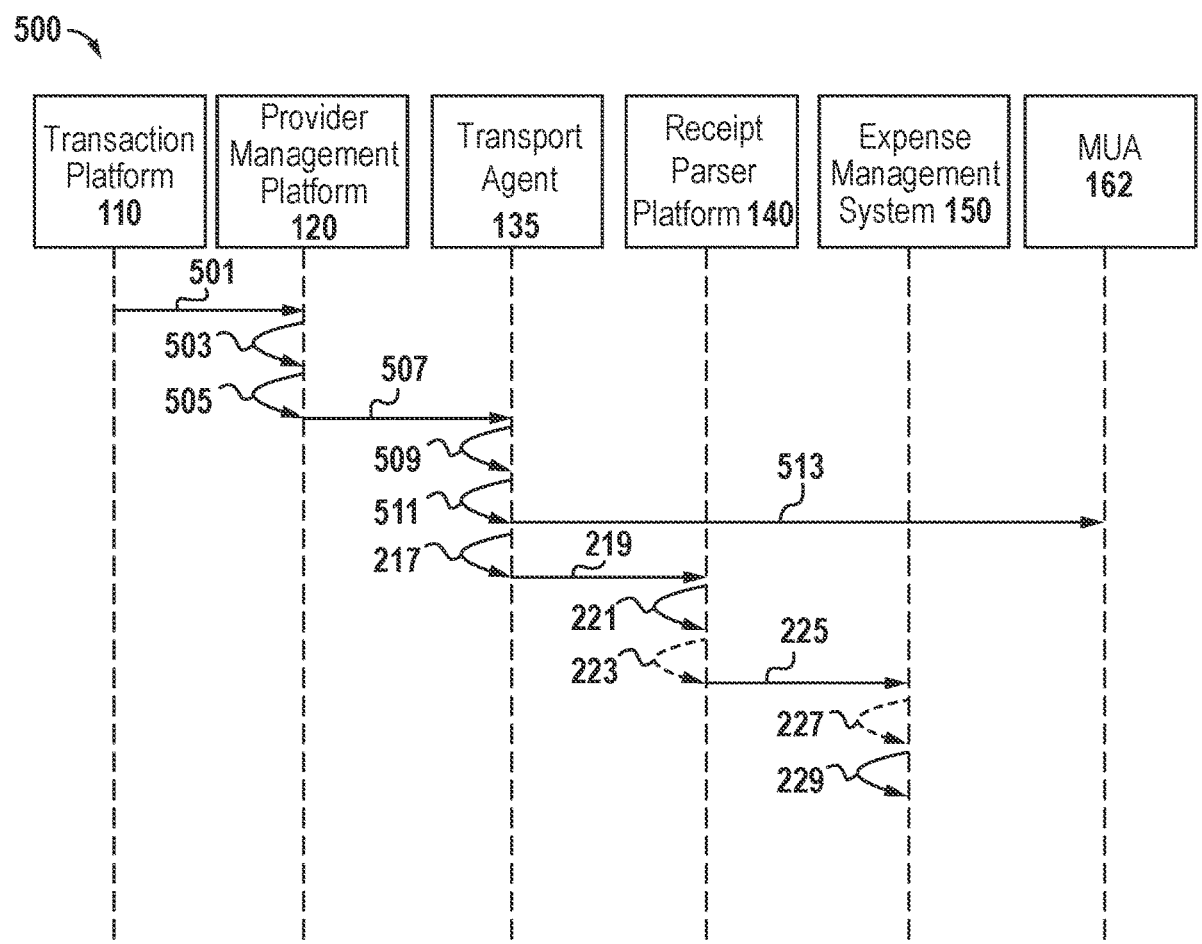
FIG. 5 is a flow diagram depicting another example process of modifying electronic mail having receipt data for interception by mail transport agents.

FIG. 5 illustrates an example process 500 in which transaction platform 110 pushes an email address associated with an end user into a record associated with the end user that is stored within a profile database (e.g., profile database 124 of FIG. 1) managed by provider management system 120, at step 501. The email address being provided to transaction platform 110 by the end user as part of a transaction involving a good and/or service offered by a provider associated with provider management system 120.

Upon delivering the good and/or service underlying the transaction to the end user, provider management system 120 generates receipt data for the transaction, at step 503. At step 505, provider management system 120 creates an email with an MUA (e.g., MUA 122 of FIG. 1) that includes the receipt data, an originator header field comprising an email address associated with the MUA of provider management system 120, and a destination header field comprising the email address provided by the end user. At step 507, the provider management system 120 communicates the email to the email address using the MUA.

At step 509, transport agent 135 detects a pattern within the email indicative of emails comprising receipt data. The pattern detected by transport agent 135 at step 509 being defined, in part, by the email address (i.e., the email address associated with the MUA of provider management system 120) within the originator header field being included within a white list of providers. In an embodiment, the white list of providers is managed by a component of an email server (e.g., email server 130 of FIG. 1) associated with transport agent 135. In an embodiment, receipt manager platform 140 pushes the white list of providers into a database managed by an email server associated with transport agent 135.

At step 511, transport agent 135 evaluates the email against one or more additional criterion defining the pattern. In an embodiment, the one or more additional criterion includes: identifying an attachment within content of the email, identifying predefined characters within a subject header field of the email, comparing the destination header field of the email to a black list, and the like. At step 513, transport agent 135 forwards the email to a MUA 162 associated with the end user. As seen in FIG. 5, process 500 concludes with steps 217-229 from process 200 of FIG. 2.

Figure 6:
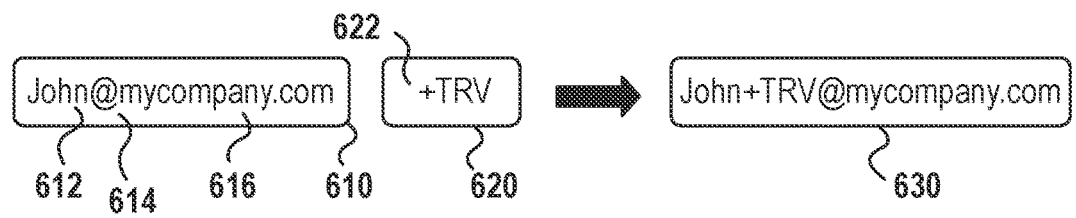
FIG. 6 illustrates an example proxy email address in accordance with embodiments of the present invention.
Figure 7:
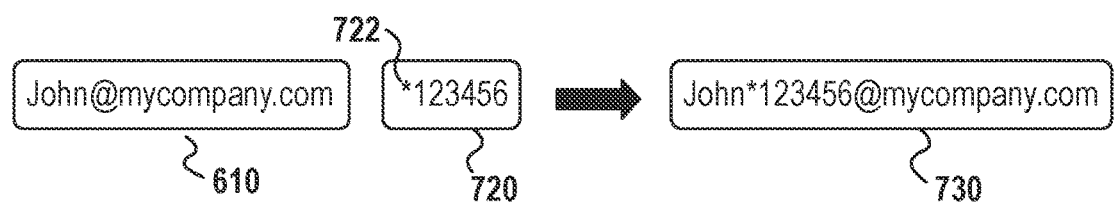
FIG. 7 illustrates another example proxy email address in accordance with embodiments of the present invention.
Figure 8:
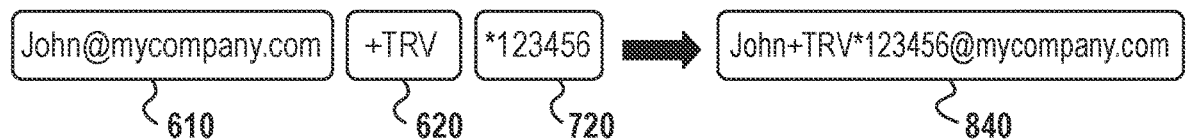
FIG. 8 illustrates another example proxy email address in accordance with embodiments of the present invention.

FIGS. 6-8 illustrate example proxy email addresses in accordance with embodiments of the present invention. As used herein, a "proxy email address" generally refers to an email address generated by adding one or more of an extension and a transaction identifier associated with a transaction to an email address that a purchaser (e.g., an end user associated with user device 160 of FIG. 1) as part of a transaction.

FIG. 6 illustrates an example of a proxy email address 630 generated by adding an extension 620 to email address 610. As used herein, an "extension" refers to a predefined arrangement of characters forming (alone or in combination with other content comprising an email) a pattern that a transport agent of an email server recognizes as being associated with an email comprising receipt data. The predefined arrangement of characters may include: alphabetic characters; numeric characters, alpha-numeric characters, punctuation marks, American Standard Code for Information Interchange ("ASCII") control characters, and the like. In an embodiment, extension 620 includes a separator 622 that distinguishes extension 620 from other portions of proxy email address 630. In the example of FIG. 6, separator 622 is depicted as a plus sign character. In an embodiment, separator 622 is implemented as a null character or an ASCII control character.

In FIG. 6, extension 620 is illustrated in proxy email address 630 as intervening between local-part 612 and @ symbol 614 of email address 610. One skilled in the art will recognize that extension 620 may be added to email address 610 in other arrangements to generate proxy email address 630. For example, extension 620 may be added to email address 610 such that it precedes local-part 612 to generate proxy email address 630. As another example, extension 620 may be added to email address 610 such that it intervenes between @ symbol 614 and domain 616 to generate proxy email address 630.

FIG. 7 illustrates an example of a proxy email address 730 generated by adding a transaction identifier 720 to email address 610. As used herein, a "transaction identifier" refers to a globally unique arrangement of characters assigned to each transaction involving a transaction platform (e.g., transaction platform 110 of FIG. 1). The globally unique arrangement of characters may include: alphabetic characters; numeric characters, alpha-numeric characters, punctuation marks, ASCII control characters, and the like. In an embodiment, transaction identifier 720 includes a separator 722 that distinguishes transaction identifier 720 from other portions of proxy email address 730. In the example of FIG. 7, separator 722 is depicted as an asterisk symbol. In an embodiment, separator 722 is implemented as a null character or an ASCII control character.

In FIG. 7, transaction identifier 720 is illustrated in proxy email address 730 as intervening between local-part 612 and @ symbol 614 of email address 610. One skilled in the art will recognize that transaction identifier 720 may be added to email address 610 in other arrangements to generate proxy email address 730. For example, transaction identifier 720 may be added to email address 610 such that it precedes local-part 612 to generate proxy email address 730. As another example, transaction identifier 720 may be added to email address 610 such that it intervenes between @ symbol 614 and domain 616 to generate proxy email address 730.

In an embodiment, at least a portion of a transaction identifier may include one or more characters assigned to a particular transaction by a transaction platform. For example, the transaction platform may be implemented as a component of a global distribution system. In this example, at least a portion of a transaction identifier may include characters comprising a passenger name record (or booking reference). In this example, the passenger name record may identify a record in a database of a computer reservation system defining an itinerary associated with the particular transaction. In an embodiment, at least a portion of a transaction identifier may include one or more characters assigned to a particular transaction by a provider management system (e.g., provider management system 120 of FIG. 1). For example, at least a portion of a transaction identifier may include characters (e.g., a trip identifier) that the provider management system generates for goods and/or services underlying the particular transaction.

In an embodiment, at least a portion of a transaction identifier may include one or more characters assigned to an expense request associated with a particular transaction by an expense management system (e.g., expense management system 150 of FIG. 1). For example, an end user may submit an expense request to the expense management system seeking reimbursement for goods and/or services underlying the particular transaction. In this example, the end user may receive a confirmation number (or request reference) from the expense management system that identifies the expense request. In an embodiment, the end user may submit the confirmation number to a transaction platform as part of the transaction. In an embodiment, a transaction platform may query the expense management system to obtain the confirmation number.

FIG. 8 illustrates an example of a proxy email address 840 generated by adding extension 620 and transaction identifier 720 to email address 610. In FIG. 8, extension 620 is illustrated in proxy email address 840 as preceding transaction identifier 720. One skilled in the art will recognize that extension 620 and transaction identifier 720 may be added to email address 610 in other arrangements to generate proxy email address 840. For example, transaction identifier 720 may be added to email address 610 such that it precedes extension 620.

FIG. 8 also illustrates extension 620 and transaction identifier 720 as forming a continuous portion of proxy email address 840. In an embodiment in which extension 620 and transaction identifier 720 forms a continuous portion of proxy email address 840, proxy email address 840 lacks any separators intervening between extension 620 and transaction identifier 720. By way of example, if extension 620 and transaction identifier 720 form the continuous portion of proxy email address 840 as arranged in the example of FIG. 8, separator 722 of transaction identifier 720 may be omitted when generating proxy email address 840 in accordance with this embodiment. As another example, if transaction identifier 720 precedes extension 620 in forming a continuous portion of a proxy email address, separator 622 of extension 620 may be omitted when generating the proxy email address in accordance with the foregoing embodiment. In an embodiment, extension 620 and transaction identifier 720 may form discontinuous portions of proxy email address 840. For example, transaction identifier 720 may be added to email address 610 such that it precedes local-part 612 to generate proxy email address 840 whereas extension 620 may be added to intervene between local-part 612 and @ symbol 614. In an embodiment, extension 620 and transaction identifier 720 may be added to email address 610 on opposing sides of @ symbol 614 to generate proxy email address 840. For example, transaction identifier 720 may be added to email address 610 such that it intervenes between local-part 612 and @ symbol 614 to generate proxy email address 840 whereas extension 620 may be added to intervene between @ symbol 614 and domain 616.

FIG. 9 illustrates an example of self-describing (or structured) data 900 encoding receipt data in accordance with embodiments of the present invention. In the example of FIG. 9, self-describing data 900 is illustrated as a JavaScript Object Notation for Linked Data ("JSON-LD") structured data snippet. However, one skilled in the art may recognize that self-describing data 900 may be implemented using other structured formats, such as eXtensible Markup Language ("XML").

Self-describing data 900 includes a script tag 910 that defines a client-side script for use by an application (e.g., a web browser application) parsing self-describing data 900. The application parsing self-describing data 900 identifies a schema (or vocabulary) used to implement self-describing data 900 based on element 920. Element 930 defines a particular item type (e.g., the "Receipt" item type) of the schema comprising self-describing data 900. The particular item type of self-describing data 900 is defined by a set of item properties, such as a "broker" item property 940, a "customer" item property 950, and a "payment" item property 960. Nested within each item property of self-describing data 900 are one or more sub-item types defining that item property. Each sub-item type is defined by attribute/value data. By way of example, nested within the "customer" item property 950 is a "Person" sub-item type that is defined with a "name" attribute having a "John Doe" value.

FIG. 10 is a flow-chart illustrating an example of a method 1000 of modifying electronic mail having receipt data for interception by mail transport agents, in accordance with an embodiment of the invention. In an embodiment, method 1000 is implemented by receipt manager platform 140 of FIG. 1.

At block 1001, an invoice email sent by an email server is received when a transport agent of the email server detects a pattern within content of an inbound email. In an embodiment, the pattern corresponds to a proxy email address is generated by an online transaction platform (e.g., transaction platform 110 of FIG. 1) responsive to a transaction underlying the receipt data. In an embodiment, the pattern corresponds to a flag defined by metadata introduced into a subset of the content by an originator (e.g., provider management system 120 of FIG. 1) of the inbound email. In an embodiment, the subset of the content includes: plain text header information, an attachment, HTML header information, or a combination thereof. In an embodiment, the pattern corresponds to a white list of providers comprising an originator email address included within an originator header field of the inbound email.

In an embodiment, the inbound email is sent by an originator responsive to completion of a transaction underlying the receipt data. In an embodiment, the inbound email includes a flag defined by metadata introduced into a subset of the content by an originator of the inbound email. In an embodiment, the inbound email includes a destination header field comprising a proxy email address pushed into a profile database (e.g., profile database 124 of FIG. 1) managed by an originator of the inbound email by an online transaction platform involved in a transaction underlying the receipt data. In an embodiment, the invoice mail is received at a mailbox managed by the receipt manager platform.

At block 1003, the invoice email is parsed to extract receipt data and an email address that identifies a recipient of the inbound email. In an embodiment, parsing the invoice email includes providing the invoice email as an input to an optical character recognition process to obtain the receipt data on an output of that process. In an embodiment, the invoice email includes self-describing data encoding the receipt data. In an embodiment, the self-describing data is injected into the invoice email as: plain text header information, attachment metadata, HTML header information, or a combination thereof.

At block 1005, the receipt data is pushed to an expense management system associated with the recipient for further processing. In an embodiment, further processing of the receipt data by the expense management system includes a reconciliation process that maps: (i) the recipient to a user profile associated with the expense management system; (ii) the receipt data to a transaction associated with the receipt data; (iii) the receipt data to an expense statement comprising the transaction; or a combination thereof. In an embodiment, the receipt data is pushed to the expense management system as an attachment sent with the invoice email. In an embodiment, the receipt data is pushed to the expense management system as self-describing data (e.g., self-describing data 900 of FIG. 9) encoding the receipt data.

In an embodiment, method 1000 further comprises pushing the email address that identifies the recipient of the inbound email to the expense management system to facilitate reconciliation of the recipient with a user profile of the expense management system. In an embodiment, the user profile resides in a profile database (e.g., database 152 of FIG. 1) managed by the expense management system. In an embodiment, method 1000 further comprises performing a reconciliation process that maps: (i) the recipient to a user profile associated with the expense management system; (ii) the receipt data to a transaction associated with the receipt data; (iii) the receipt data to an expense request comprising the transaction; or a combination thereof. In an embodiment, method 1000 further comprises selecting the expense management system from a plurality of expense management systems based on the email address that identifies the recipient of the inbound email.

In an embodiment, method 1000 is performed by processing logic, including hardware, firmware, software, or a combination thereof. In an embodiment, method 1000 is performed by a processor executing code stored in a non-transitory computer-readable medium (e.g., a memory).

Figure 11:
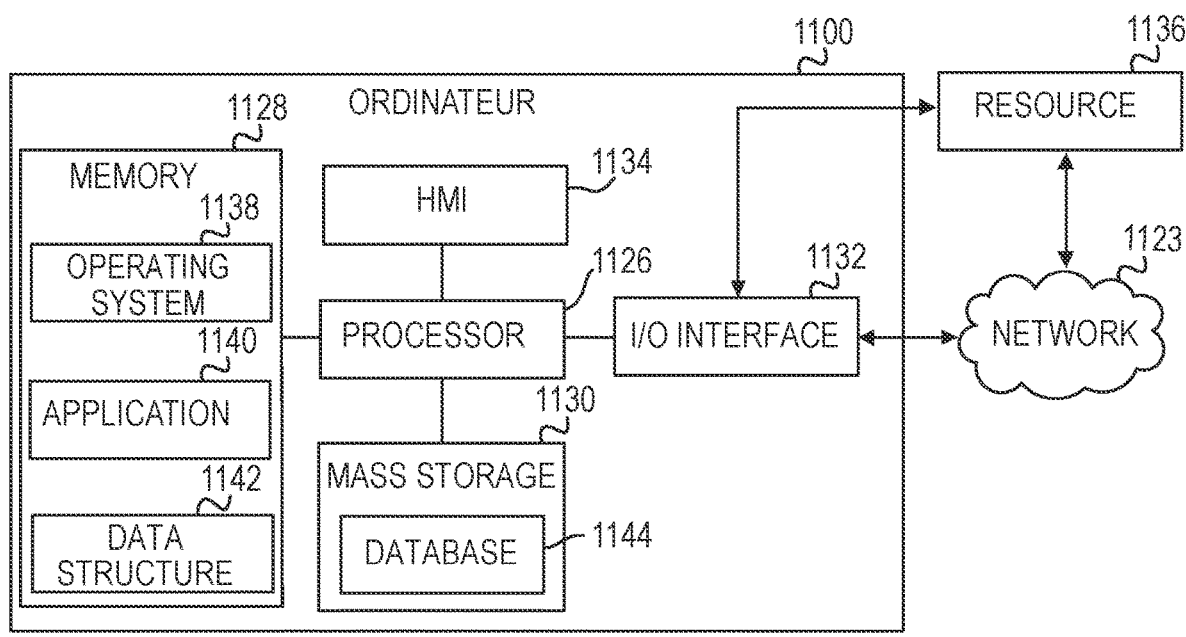
FIG. 11 is a block diagram of an example computing environment suitable for use in implementing embodiments of the invention.

Having described various embodiments of the invention, an exemplary computing environment suitable for implementing embodiments of the invention is now described. With reference to FIG. 11, transaction platform 110; provider management system 120; MUAs 122, 142, and 162; email server 130; transport agent 135; receipt manager platform 140; expense management system 150; and client device 160 may be implemented on one or more computer devices or systems, such as exemplary computer system 1100. The computer system 1100 may include a processor 1126, a memory 1128, a mass storage memory device 1130, an input/output (I/O) interface 1132, and a Human Machine Interface (HMI) 1134. The computer system 1100 may also be operatively coupled to one or more external resources 1136 via the network 1123 or I/O interface 1132. External resources 1136 may include, but are not limited to, servers, databases, mass storage devices, peripheral devices, cloud-based network services, or any other suitable computer resource that may be used by the computer system 1100.

The processor 1126 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1128. The memory 1128 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 1130 may include data storage devices such as a hard drive, optical drive, tape drive, non-volatile solid state device, or any other device capable of storing information.

The processor 1126 may operate under the control of an operating system 1138 that resides in the memory 1128. The operating system 1138 may manage computer resources so that computer program code embodied as one or more computer software applications, such as an application 1140 residing in memory 1128, may have instructions executed by the processor 1126. In an alternative embodiment, the processor 1126 may execute the application 1140 directly, in which case the operating system 1138 may be omitted. One or more data structures 1142 may also reside in memory 1128, and may be used by the processor 1126, operating system 1138, or application 1140 to store or manipulate data.

The I/O interface 1132 may provide a machine interface that operatively couples the processor 1126 to other devices and systems, such as the network 1123 or the one or more external resources 1136. The application 1140 may thereby work cooperatively with the network 1123 or the external resources 1136 by communicating via the I/O interface 1132 to provide the various features, functions, applications, processes, or modules comprising embodiments of the invention. The application 1140 may also have program code that is executed by the one or more external resources 1136, or otherwise rely on functions or signals provided by other system or network components external to the computer system 1100. Indeed, given the nearly endless hardware and software configurations possible, persons having ordinary skill in the art will understand that embodiments of the invention may include applications that are located externally to the computer system 1100, distributed among multiple computers or other external resources 1136, or provided by computing resources (hardware and software) that are provided as a service over the network 1123, such as a cloud computing service.

The HMI 1134 may be operatively coupled to the processor 1126 of computer system 1100 in a known manner to allow a user to interact directly with the computer system 1100. The HMI 1134 may include video or alphanumeric displays, a touch screen, a speaker, and any other suitable audio and visual indicators capable of providing data to the user. The HMI 1134 may also include input devices and controls such as an alphanumeric keyboard, a pointing device, keypads, pushbuttons, control knobs, microphones, etc., capable of accepting commands or input from the user and transmitting the entered input to the processor 1126.

A database 1144 may reside on the mass storage memory device 1130, and may be used to collect and organize data used by the various systems and modules described herein. The database 1144 may include data and supporting data structures that store and organize the data. In particular, the database 1144 may be arranged with any database organization or structure including, but not limited to, a relational database, a hierarchical database, a network database, or combinations thereof. In an embodiment, database 124 and/or database 152 of FIG. 1 may be implemented using one or more databases, such as exemplary database 1144. A database management system in the form of a computer software application executing as instructions on the processor 1126 may be used to access the information or data stored in records of the database 1144 in response to a query, where a query may be dynamically determined and executed by the operating system 1138, other applications 1140, or one or more modules.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

What is claimed is:

1. A system comprising:
   a processor; and
   a computer-readable storage medium comprising instructions that upon execution by the processor cause the processor to perform operations, the operations comprising:
   upon delivering a good and/or a service underlying a transaction to an end user, generating receipt data for the transaction;
   creating an email that includes content that comprises the receipt data; and
   introducing metadata into the email by encoding the receipt data with self-describing data, wherein the metadata defines a flag corresponding to a subset of the content comprised by the email.

2. The system of claim 1 wherein the flag indicates a content type and marks the email or an attachment of the email as a receipt.

3. The system of claim 1 wherein the subset of the content includes: plain text header information, an attachment, HTML header information, or a combination thereof.

4. The system of claim 1 wherein the email further includes a destination header field comprising an email address provided by the end user.

5. The system of claim 4 wherein the email is communicated to the email address provided by the end user.

6. A method comprising:
   upon delivering a good and/or a service underlying a transaction to an end user, generating receipt data for the transaction;
   creating an email that includes content that comprises the receipt data; and
   introducing metadata into the email by encoding the receipt data with self-describing data, wherein the metadata defines a flag corresponding to a subset of the content comprised by the email.

7. The method of claim 6 wherein the flag indicates a content type and marks the email or an attachment of the email as a receipt.

8. The method of claim 6 wherein the subset of the content includes: plain text header information, an attachment, HTML header information, or a combination thereof.

9. The method of claim 6 wherein the email further includes a destination header field comprising an email address provided by the end user.

10. The method of claim 9 wherein the email is communicated to the email address provided by the end user.

* * * * *